United States Patent [19]
Gali

[11] Patent Number: 5,633,575
[45] Date of Patent: May 27, 1997

[54] BATTERY RECLAIMER AND CHARGER

[76] Inventor: Carl E. Gali, 16725 N. Red Sunset Trail, Tucson, Ariz. 85737

[21] Appl. No.: 586,981

[22] Filed: Jan. 16, 1996

Related U.S. Application Data

[63] Continuation of Ser. No. 220,833, Mar. 31, 1994.
[51] Int. Cl.$^6$ .................................................. H02J 7/00
[52] U.S. Cl. .......................... 320/21; 320/61; 323/906; 363/19
[58] Field of Search ................................ 320/21

[56] References Cited

U.S. PATENT DOCUMENTS

| | | | |
|---|---|---|---|
| 3,609,502 | 9/1971 | Burkett | 320/5 |
| 4,016,474 | 4/1977 | Mason | 320/15 |
| 4,629,963 | 12/1986 | Morris | 320/3 |
| 4,710,695 | 12/1987 | Yamada et al. | 320/21 |
| 5,063,341 | 11/1991 | Gali | 320/21 |
| 5,113,127 | 5/1992 | Hoffman et al. | 320/21 |
| 5,276,393 | 1/1994 | Gali | 320/21 |
| 5,491,399 | 2/1996 | Gregory et al. | 320/61 |

*Primary Examiner*—Steven L. Stephan
*Assistant Examiner*—Nicholas Ponomarenko
*Attorney, Agent, or Firm*—John E. Vandigriff

[57] ABSTRACT

The invention is to a battery reclaimer, charger and maintainer circuit for removing current blocking deposits from plates of batteries utilizing liquid and jell electrolytes. The circuit includes an output circuit including at least one battery. A D.C. voltage source providing a D.C. voltage for charging said battery connected to said output circuit. An oscillator circuit for producing fast rise time voltage pulses is close coupled to an rf transformer, connecting the oscillator circuit to the output circuit in parallel with the D.C. voltage source. A rectifier circuit is connected between the transformer and the output circuit, the rectifier circuit including a two diode rectifying circuit for producing a full wave voltage output positive pulse having an RF content.

18 Claims, 10 Drawing Sheets

BATTERY RECLAIMER AND CHARGER

FIELD OF THE INVENTION

This invention relates in general to battery chargers, and more particularly, to a battery reclaimer, maintaining and current charger for liquid electrolyte and jell electrolyte supplied batteries.

This a continuation of application Ser. No. 08/220,833, filed Mar. 31, 1994.

BACKGROUND OF THE INVENTION

A characteristic of liquid electrolyte type batteries, particularly lead acid batteries, is that chemical compound deposits slowly build up on the plates to partially or entirely cover, and displace the normal plate surfaces. Low current recharging is inadequate in that it cannot, as such, sufficiently remove deposits that, with the passage or time, crystallize and choke the battery plates by interfering with and blocking the electrolyte movement. Through the years may people have tried to dislodge these deposits by "fast charging", an approach that usually over heats and warps the lead plates in a lead acid battery. When this occurs, a battery may still appear to have taken a charge and the electrolyte may check as being correct, but the battery does not hold the charge as the plates are effectively shorted. The transfer between metal (lead) electrodes and ions in a solution is not instantaneous. This causes a skin effect over the entire lead plate surfaces, and the lead sulfation that is built up on plate surfaces will be released, either going back into the solution or broken up. Batteries using other electrolytes also face reclaiming, maintenance and charging problems that need to be successfully addressed.

It is therefore, a principal object of this invention to provide a combination reclaiming, maintaining and charging circuit for batteries.

Another object is to provide a combination reclaiming, maintaining and charging circuit capable of removing current blocking deposits from battery plates.

A further object is to prevent overheating and warpage of plates in a battery when charging efforts are made to dislodge deposits from battery plates, and to prevent explosion of batteries with overheating.

Still another object is to significantly extend the useful service life and reliability of batteries at reasonable cost.

SUMMARY OF THE INVENTION

Features of the invention useful in accomplishing the above objects include a battery reclaimer and charger unit that supplies a voltage having fast rise time voltage pulses. The reclaimer-charger may have an AC to DC, or DC power supply. The pulse envelopes have an extremely fast rise time. The pulse signals are passed through a close coupled RF transformer to the battery. The transformer has a secondary winding producing a voltage full wave output sharply defined through a two diode rectifying circuit which provides a multi-frequency 10 KHz to 100 Khz output pulse, each pulse having an RF content in the 2–10 megahertz frequency range, corresponding to specific frequencies equal to natural resonant frequencies of the specific electrolytes used in batteries. These resulting high frequency RF output signals in each pulse envelope are capable of reclaiming, maintaining and charging batteries that use a liquid electrolyte or jell electrolyte, and the output is beneficial to dry cell batteries as well in extending battery life.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT

Figure 1:
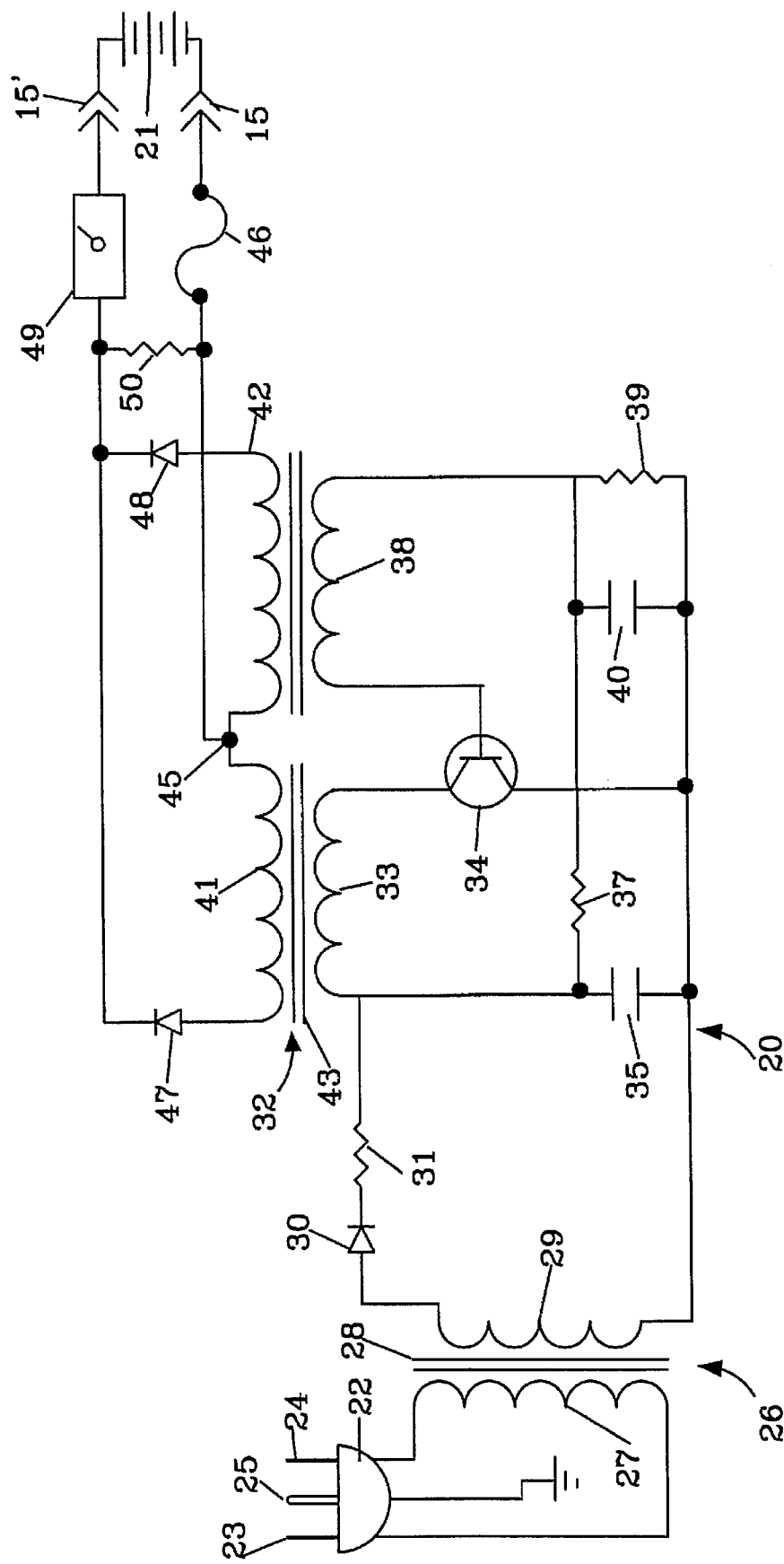
FIG. 1 is a schematic diagram of a battery reclaimer and charger unit with a one transistor oscillator inverter circuit.

The AC to DC input powered battery reclaimer and charger 20, of FIG. 1, for batteries 21, is shown to have three pronged plug 22, insertable into a 110 volt AC receptacle, with opposite AC prongs 23 and 24 and a ground prong 25. The ground prong 25 is connected to ground and the AC prongs 23 and 24 are connected to opposite ends of transformer 26 primary coil 27. Transformer 26 has a ferrite ceramic core element 28 between primary coil 27 and secondary coil 29 that has a voltage rectifying diode 30, the anode of which is connected to an end of coil 29, and the cathode is connected through resistor 31 to and through transformer 32 primary coil 33 to collector of PNP transistor 34.

The junction of resistor 31 and coil 33 is connected through capacitor 35 to the negative voltage line 36, and through resistor 37 and transformer primary coil 38 to the base of transistor 34. Resistor 37 is also connected through resistor 39 and capacitor 40 to negative voltage line 36. The emitter of NPN transistor 34 is connected to line 36. It should be noted that transformer 32, in addition to first and second primary coils 33 and 38 respectively, have first and secondary primary coils 41 and 42, respectively, and first and second ferrite ceramic core elements 43 and 44, respectively. Center tap 45, between first a and secondary coils 41 and 42, is connected through fuse 46 and connector 15 to the negative terminal of battery 21. The outer ends of the first and second secondary coil 41 and 42 are, respectively, connected to the anodes of diodes 47 and 48, through the diodes to voltage meter 49, and through resistor 50 to the center tap 45 fuse 46 junction. The other side of voltmeter 49 is connected through connector section 15' to the positive terminal of the battery 21. The transistor 34 circuit is a relaxation oscillator, running at a frequency between 2 to 10 megahertz, using close coupled current coupling between transistor base 34 base and collector, and providing the polarity reversal for positive feedback. Secondary windings 41 and 42 provide a current-voltage full wave pulse output capable of charging, maintaining, and reclaiming batteries that possess a liquid or jell electrolyte. It should be noted that the 2 to 10 megahertz frequency of the relaxation oscillator contributes to the battery plates skin effect of magnetic coupling, and enhances cleansing of the battery plates of chemical deposits.

Figure 2:
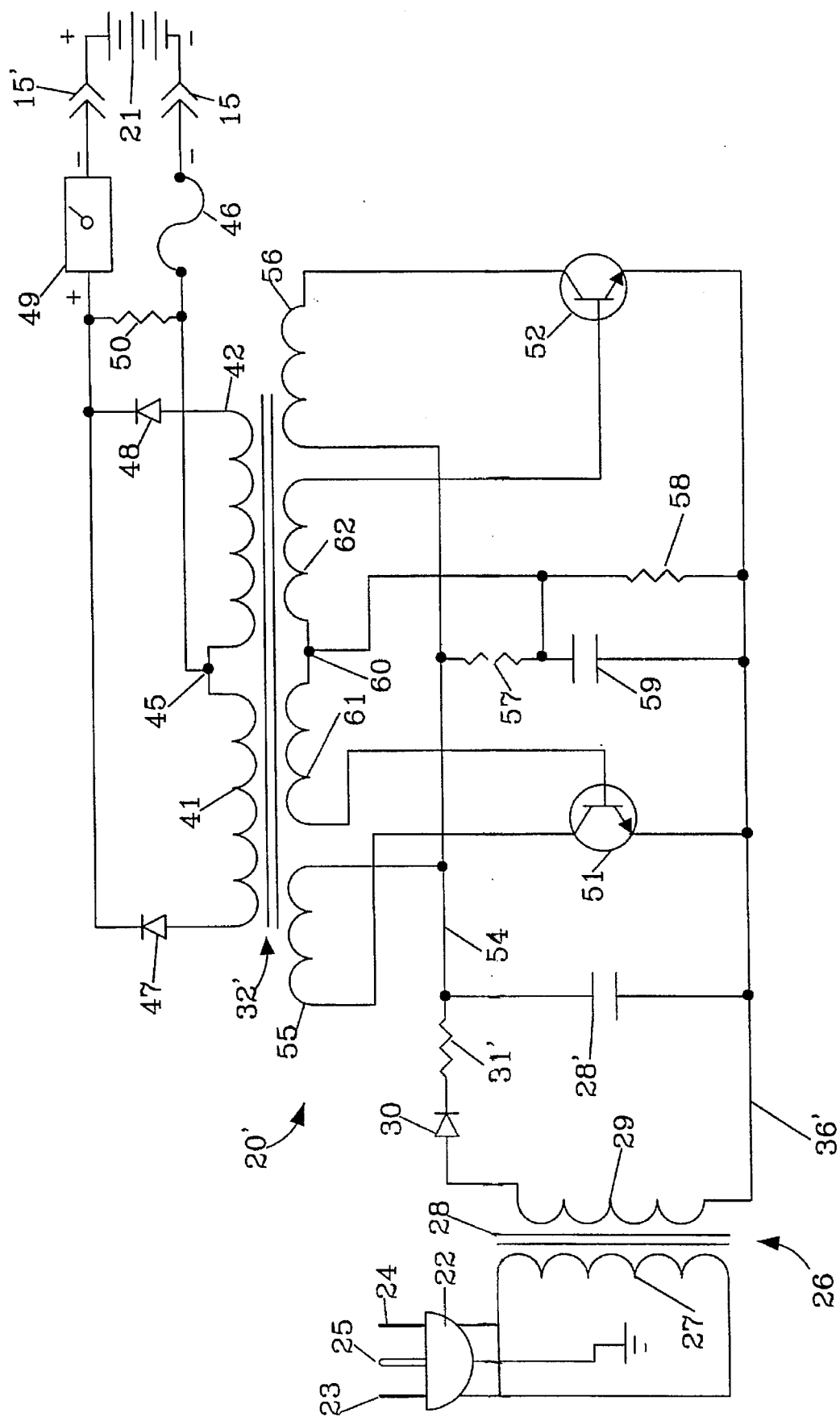
FIG. 2 is a schematic diagram of a battery reclaimer and charger unit with a two transistor relaxation blocking bistable multi-vibrator circuit.

FIG. 2 is a two NPN transistor (51 and 52) relaxation bistable multi-vibrator circuit 53. The positive line 54 out of the resistor 31' is connected through capacitor 29' to negative line 36'. The emitters of NPN transistors 51 and 52 are connected to negative line 36', and the positive line 54 is connected through transformer opposite end coils 55 and 56 to, respectively, the collector of NPN transistor 51 and the collector of NPN transistor 52. Positive line 54 is serially connected through resistors 57 and 58 to negative line 36'. The junction of resistors 57 and 58 and capacitor 59 is connected to the tap 60 between the primary coils 61 and 62, of transformer 32', the other ends of which are connected, respectively, to the bases of NPN transistors 51 and 52. In transformer 32', a single ferrite ceramic core element 63 is used between the four clips 55, 61, 62 and 56 on the primary side, with two secondary coils 41 and 42 on the secondary output side of transformer 32'. In all the regards, the output is the same as with the embodiment of FIG. 1.

Figure 3:
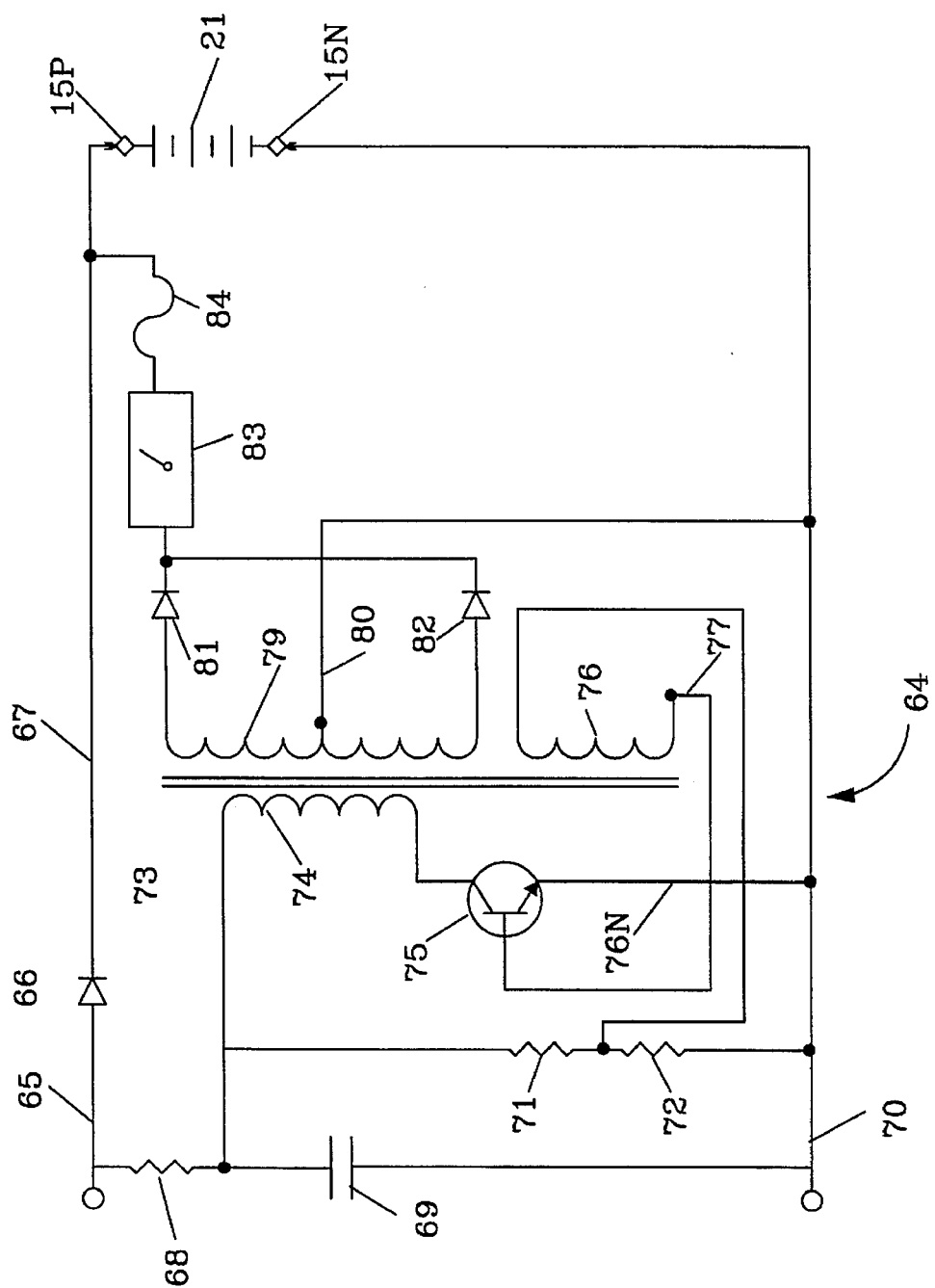
FIG. 3 is a schematic diagram of a reclaimer and charger unit with direct DC charging, and a multi-pulse voltage super-imposed thereon.

Referring now to the embodiment of FIG. 3, a reclaimer and charger unit 70 is shown connected for direct DC charging battery 21. In this circuit, a multi-pulse output voltage is superimposed on the DC battery charging voltage. The positive DC output line 65 is connected to the anode of diode 66 with the cathode connected via line 67 to battery positive terminal connecting clip 15p. Positive DC voltage line 65 is connected serially though resistor 68 and capacitor 69 to negative DC voltage line 70. Line 70 extends to the battery negative terminal connecting clip 15N. The junction of resistor 68 and capacitor 69 is connected serially through resistors 71 and 72 to negative DC voltage line 70, and also through transformer 73 primary coil 74 to the collector of NPN transistor 75. The emitter of transistor 75 is connected through line 76N to the negative DC voltage line 70. The junction of resistors 71 and 72 is connected serially through coil 76 of transformer 73 for biasing transistor 75, and through line 77 to the base of NPN transistor 75. A pulse voltage generated at the collector or NPN transistor 75 is conveyed to transformer primary coil 74, and through the transformer 74 to transformer secondary coils 76 and 79. Transformer 74 has a single ferrite ceramic core element 78 for fast signal transfer. Transformer secondary coil 79 has a center tap connection through line 80 to the negative DC voltage line 70, and opposite ends of coil 79 are connected to the anodes of diodes 81 and 82, and through these diodes action to rectify the signal from coil 79 to provide a fast raise time positive DC voltage pulses. The pulses are superimposed on the DC voltage on line 67, and are applied to battery 21. The pulses are fed to and through meter 83 and fuse 84 to line 67.

Figure 4:
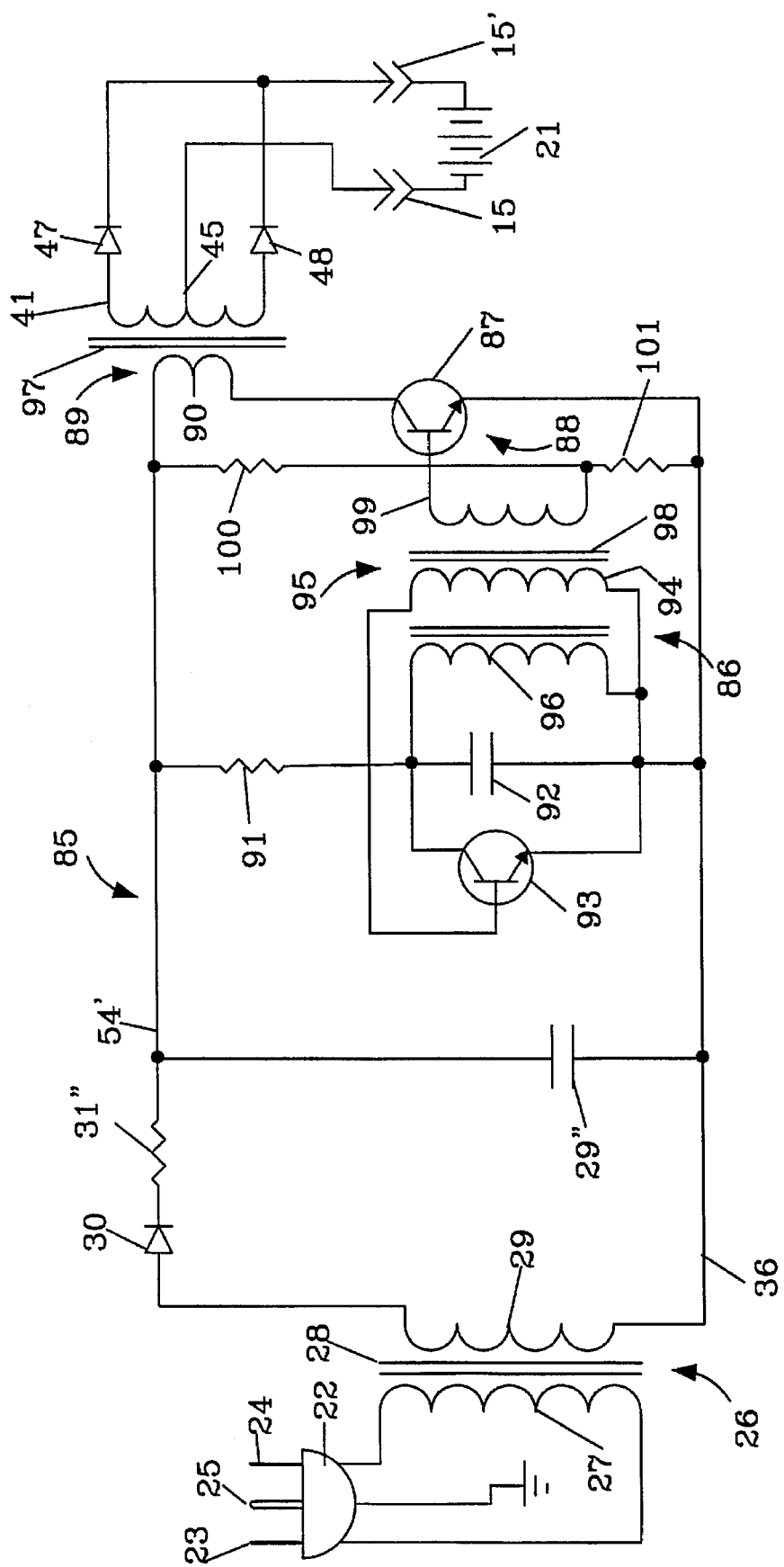
FIG. 4 is a schematic diagram of a reclaimer and charger unit with a Hartley oscillator section and a transistor amplifier pulse driver output.

FIG. 4 shows a reclaimer and charger unit 85 which includes a Hartley oscillator section 86 and a NPN transistor 87 amplifier pulse driver output section 88. The positive DC output line 54' is connected through capacitor 29" to the negative DC output line 36, and through transformer 89 primary coil 90 to the collector of NPN transistor 87. The positive DC output line 54' is connected through resistor 91 and capacitor 92 to the emitter of NPN transistor 93, and also through center coil 94 of a three coil two core transformer 95, to the base of NPN transistor 93 in the Hartley oscillator section 86. The collector of transistor 93 is connected through transformer coil 96 to DC negative line 36. Core element of coil 94 is a fast response ferrite ceramic core. As second fast response ferrite ceramic core element 98 is include in transformer 95 between center coil 94 and output coil 99. One end of coil 99 is connected to the junction of resistors 100 and 101, serially connected between lines 54' and 36, and the other end is connected to the base of NPN transistor 87. The emitter of NPN transistor 87 is connected to the DC negative line 36. The output signal is passed from primary coil 90 to secondary coil 41–42 of transformer 89. Core element 97 is a fast response ferrite ceramic core. The center tap of secondary coil 41–42 is connected through connector 15 to the negative side of battery 21, and the opposite ends of coil 41–42 are connected through rectifying diodes 47 and 48 to and through connector 15' to the positive terminal of battery 21.

Figure 5:
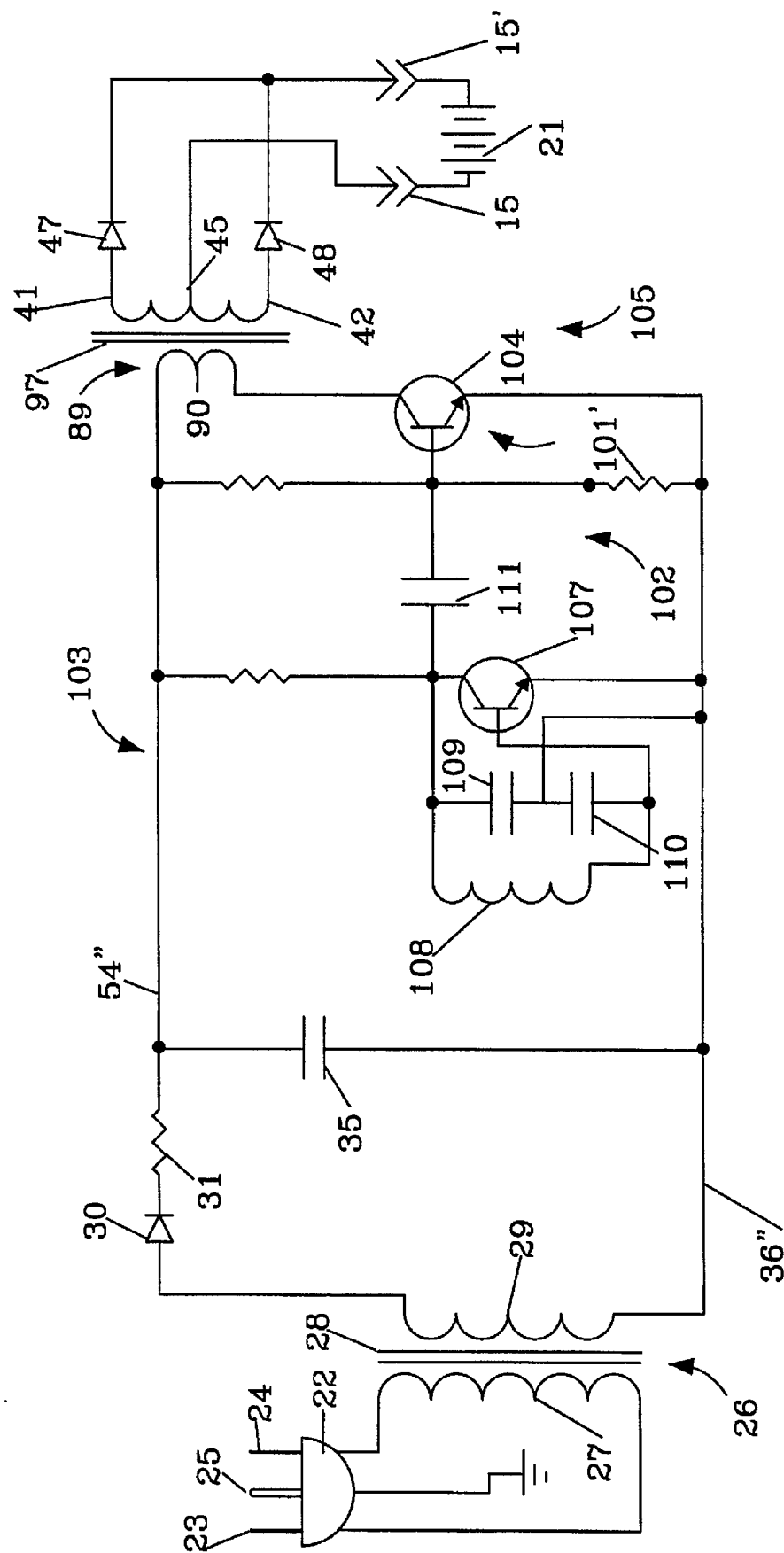
FIG. 5 is a schematic diagram of a reclaimer and charger unit with a Colpitts oscillator section and a transistor amplifier pulse driver output.

FIG. 5 shows a battery reclaimer and charger unit 102 with a Colpitis oscillator section 103 and a NPN transistor 104 amplifier pulse drive output section 105. Positive DC line 54" is connected through resistor 106 to the collector of NPN transistor 107, and through coil 108 to the base of NPN transistor 107. Capacitors 109 and 110 are series connected between opposite ends of coil 108, and the common connection between capacitors 109 and 110 is connected to the negative DC line 36". The junction between resistor 106 and the collector of NPN transistor 107 is also connected through capacitor 111 to the base of NPN transistor 87, and to the junction of resistors 100' and 101' connected between lines 54" and 36".

Figure 6:
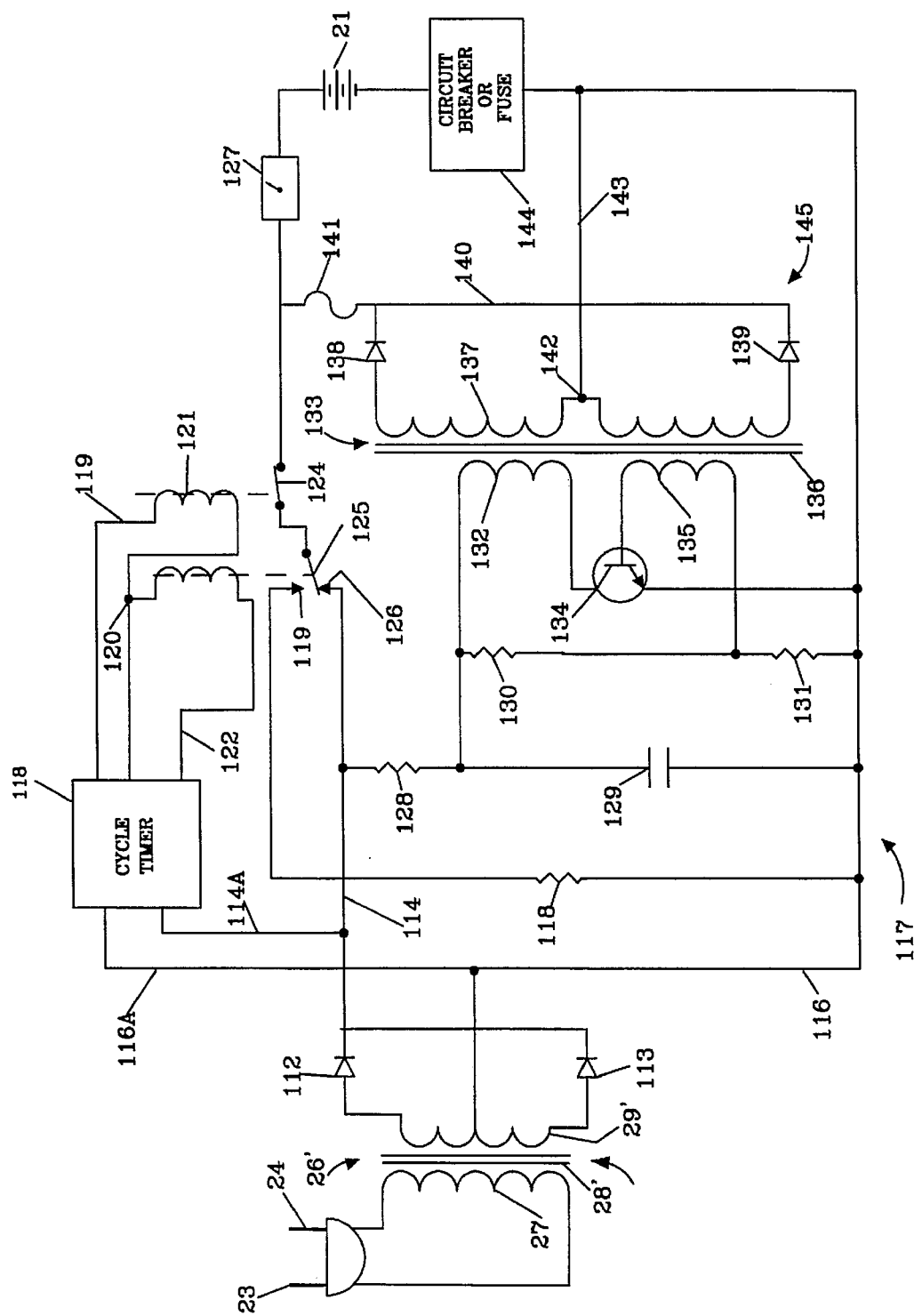
FIG. 6 is a schematic diagram similar in some respects to the embodiment of FIG. 3 with a relay controlled connection for battery charging, discharging and reclaiming section, with a multi-pulse output applied by itself or superimposed on the DC charging voltage when the relay contracts are closed.

Referring to FIG. 6, the two prongs, 23 and 24, of socket 22' are used for feeding AC to primary coil 27 of transformer 26'. Secondary coil 29' is coupled to primary coil 27 by ferrite ceramic core element 28'. Opposite ends of secondary coil 29' are connected to the anodes of diodes 112 and 113 for providing a rectified positive DC voltage to positive line 114. Negative DC voltage is fed from coil center tap 115 to negative line 116. Voltage lines 114 and 116 supply the DC voltage to power battery charging and discharging reclaimer embodiment 117. Line branch 114A from positive line 114 and line branch 116A from negative line 116 extend to cycle timer 118. Timer 118 output lines 119 and 120 extend to relay coil 121 and lines 120 and 122 are connected to relay coil 123 in order that relay switches 124 and 125 may be switched in cyclic manner, as controlled by cycle timer 118. Positive line 114 is connected to switch contact 126 of switch 125, and, in the state shown, passes positive DC through closed switch 124 and through current meter 127 to the positive terminal of battery 21 as a charging current. Negative DC line 116 is connected through resistor 118 to switch 119 of relay switch 125. When switches 119 and 124 are closed, battery 21 is discharged. Positive DC line 114 is connected through resistor 128 and capacitor 129 to negative DC line 115. The junction of resistor 128 and capacitor 129 is connected through resistor 130 and 131 to negative DC line 116, and also through first primary coil 132 of transformer 133 to the collector of NPN transistor 134. The emitter of transistor 134 is connected to negative DC line 116. The junctions of resistors 130 and 131 is connected through secondary primary coil 135 of transformer 133 to the base of NPN transistor 134. A ferrite ceramic core element 136 separates secondary coil 137 from first and second primary coils 132 and 135. Opposite ends of secondary coil 137 are connected to the anodes, respectfully, of diodes 138 and 139 having cathodes connected via line 140, through fuse 141 to positive DC line 114B, and through current meter 127 to the positive terminal of battery 21. Center tap 142 of secondary coil 137 is connected through line 143 to the negative DC voltage line 116 and to circuit breaker or fuse 144, which is connected to the negative terminal of battery 21.

Cycle timer 118 is adjusted to cycle charge and discharge battery 21 over a twenty four hour period. The charge and discharge cycles are controlled by relay switch 125. At the end of the charge and discharging cycle, relay switch 125 is opened to apply only the pulses generated by the vibrator circuit 145 to battery 21. The application of the pulses generate high frequency ringing in the circuit within each pulse structure. Resistor 118 is, for example, about one ohm for discharging battery 21. However, for small batteries, the resistance value would be increased.

Figure 7:
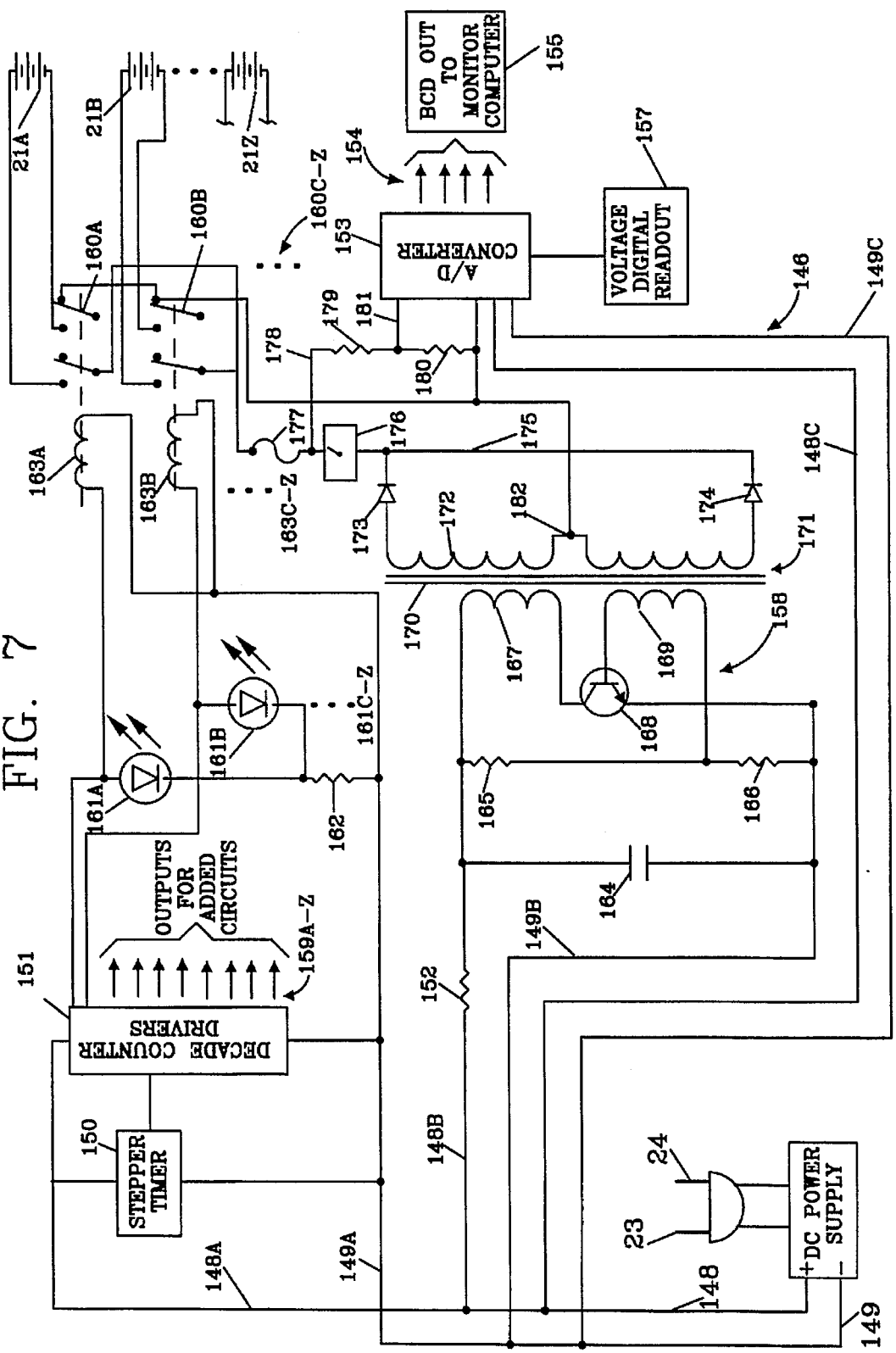
FIG. 7 is a schematic diagram of a charger/reclaimer with a timer controlled relay connection for sequentially charging and reclaiming a series of batteries.

Referring to FIG. 7, a two prongs (23 and 24) of socket 22' are used for feeding AC to AC to DC power supply 147 having a positive DC output line 148 and a negative DC output line 149. The positive DC line 148 has a branch line 148A to step timer 150 and to decade counter drivers circuit 151. A branch line 148B is connected to resistor 152 A/D and branch line 148C is connected to A/D converter circuit 153. A/D converter has multiple outputs 154 to BCD to monitor circuit 155, for informational purposes, and also, an output line 156 to voltage digital readout circuit 157. The negative DC line 149 has a branch line 149A connected to stepper timer 150, and to decade counter drivers circuit 151. Branch line 149B is connected the blocking oscillator circuit 158, and branch line 149C is connected to A/D converter circuit 153. Decade counter drivers circuit 151 has a plurality of output lines 159A–Z connected in like manner to individual relay switches 160A–Z for batteries 21A–Z. Each of lines 159A–Z has a connection to the anode of a light emitting diode 161A–Z, the cathode of which are connected in common to and through resistor 162 to negative DC branch line 149A. Negative DC branch line 149A is also connected to the relay switch coils 163A–Z. Resistor 152 is connected through capacitor 164 to the negative DC line 149 through resistors 165 and 166 to the negative DC line 149 and through first primary transformer coil 167 to the collector of NPN transistor 168. The junction of resistors 165 and 166 is connected through second primary transformer coil 169 to the base of NPN transistor 168, and the emitter of transistor 168 is connected to the negative DC line 149. Ferrite ceramic core 170, in transformer 171, separates secondary coil 172 from first and second primary coils 167 and 169. Opposite ends of transformer secondary coil 172 are connected to the anodes of diodes 173 and 174, the cathodes of which are connected through signal pulse output line 175 through current meter 176 and through fuse 177 to normally open contacts of relay switches 160A–Z, which are connected to the positive terminals of batteries 21A–Z. The output of current meter 176 is connected through line 178 to and through, serially resistors 179 and 180 to the center tap 182 of transformer secondary coil 172 that, alone with the junction line 181 of resistors 179 and 180, is connected as an input to A/D converter circuit 153. Transformer secondary coil center tap 182 is connected to normally open contacts of relay switches 160A–Z, that are connected to the negative terminals of batteries 21A–Z. Individual selected batteries 21A–Z may be relay switch 160A–Z, connected for pulse activated RF ringing frequency treating as desired. This embodiment is particularly useful for keeping battery plates cleaned on groups of batteries in use, or setting on shelf.

Figure 8:
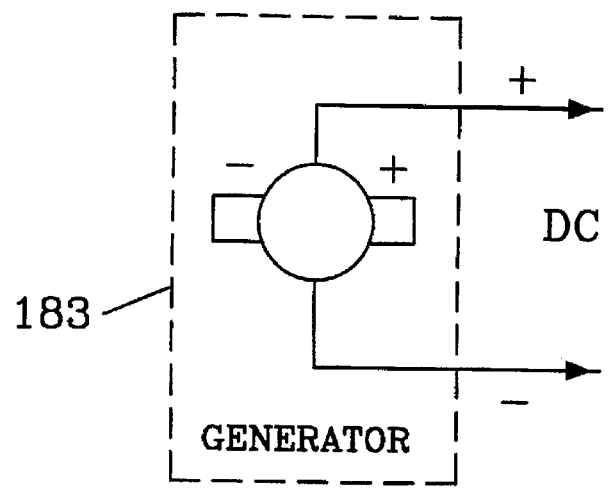
FIG. 8 shows a generator DC powered source.
Figure 9:
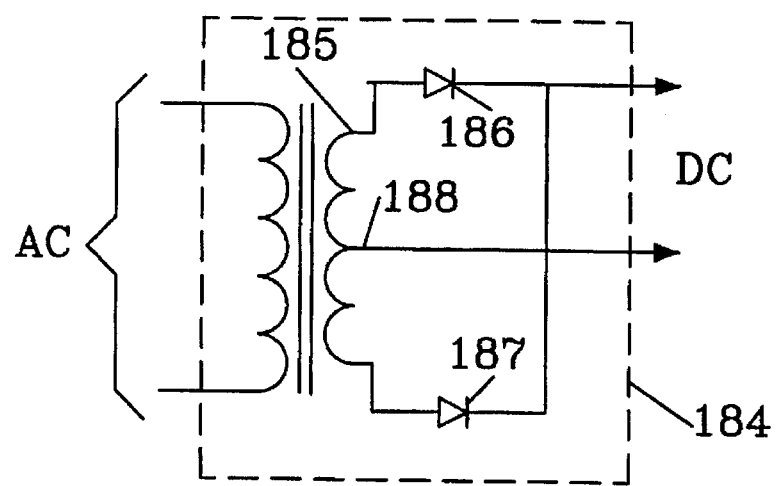
FIG. 9 shows an AC to DC converter schematic for powering various embodiment.
Figure 10:
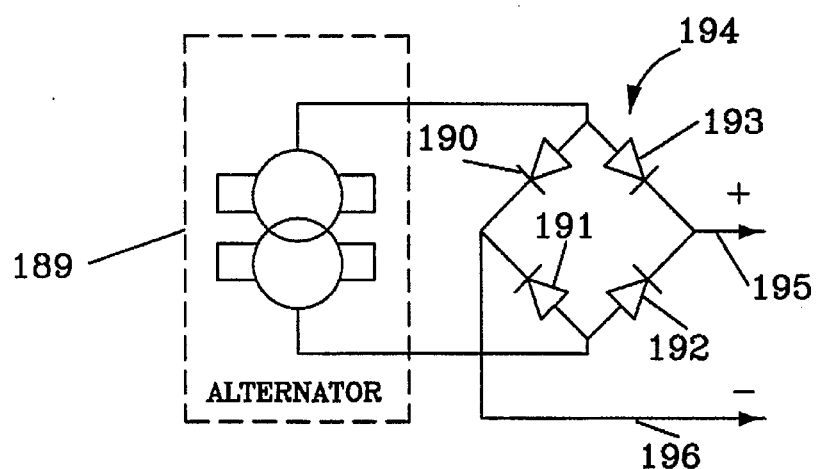
FIG. 10 shows an alternator AC power source and a diode bridge rectifier for providing DC power to various embodiments.
Figure 11:
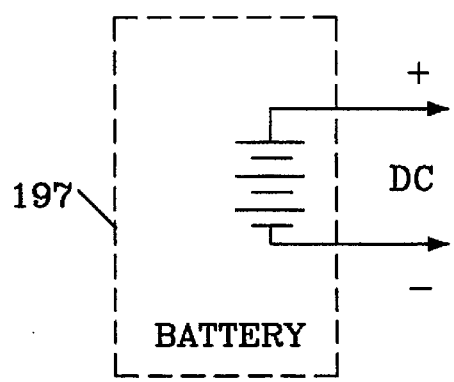
FIG. 11 shows a battery DC power source.
Figure 12:
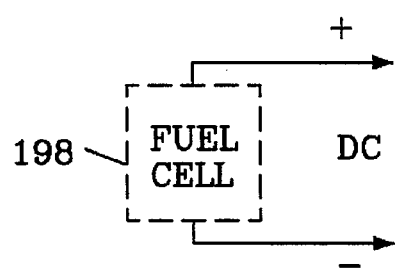
FIG. 12 shows a fuel cell as a DC power source.

Alternate DC sources for the various embodiments are shown in FIGS. 8–12. FIG. 8 shows a DC generator 183. In FIG. 9, an AC to DC transformer 184 with secondary coil 185 is connected to diodes 186 and 187. FIG. 10 shows an alternator AC source 194 and a four diode 190, 191, 192 and 193 rectifying bridge circuit for supplying a positive voltage on positive line 195 and a negative voltage on line 196. A simple battery 197 is shown in FIG. 11. FIG. 12 shows a fuel cell 198 for supplying a DC voltage.

Note that while the embodiments of FIGS. 2–7 use NPN transistors. Comparable working circuits would include, in place of NPN or PNP bipolar transistors, field effect(FET) devices, metal (MOS) devises, and unijunction(UJT) devices.

Figure 13:
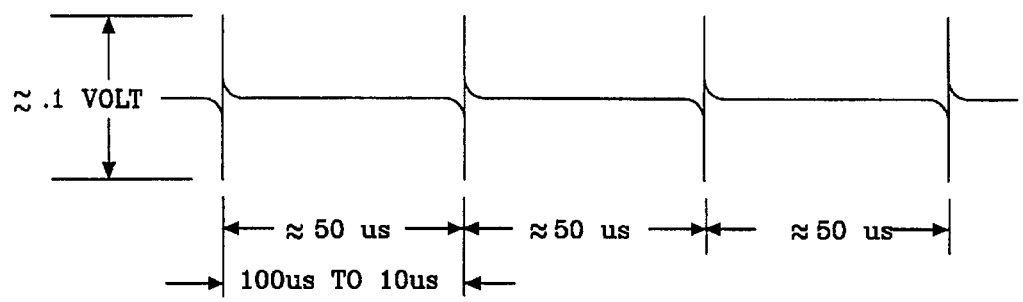
FIG. 13 shows a voltage vs. Time output wave showing a typical waveform generated as an output with the various powered battery reclaimer and charger unit embodiments.
Figure 14:
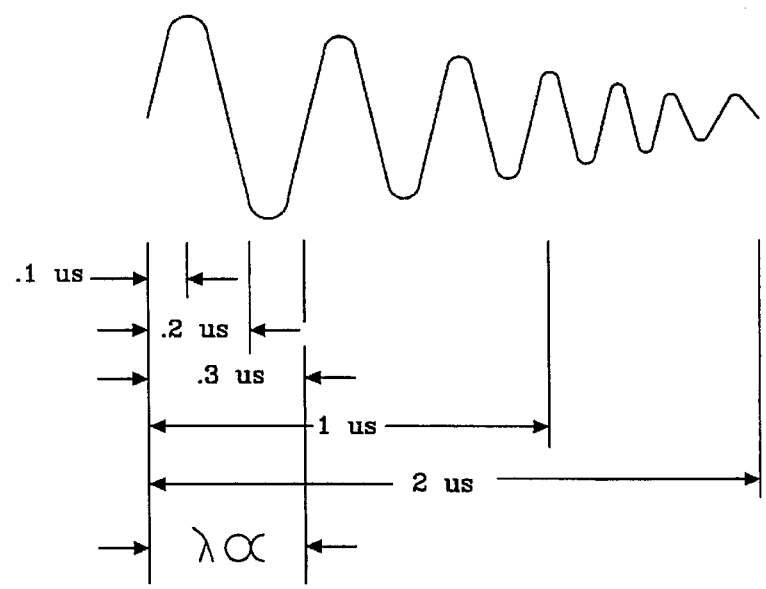
FIG. 14 shows of one of the pulses of the waveform of FIG. 13 greatly expanded.

Battery reclaimer and charger units that have a circuit connected to a battery with the electrolyte in the circuit as part of the circuit, generate an RF ringing signal which is the natural frequency of the electrolyte. FIG. 13 shows a waveform envelope of plus and minus 0.1 volt at frequencies in the 10,000 to 100,000 per second frequency range. The voltage swing of the pulse may, however be in the range of 0.05 to 0.5 volt. The waveform pulse envelope front rise time is less than one hundred nano seconds per volt. This is sharp enough to shock the battery electrolyte into resonant feedback ringing as shown in FIG. 14. FIG. 14 shows the ringing contained in each pulse envelope. The resonant energy is imparted to the electrolyte molecules, both in deposits on battery plates and in the electrolyte solution. The ringing voltage is an effective key in removing deposits of such molecules (or atoms) and dispersing them back into the electrolyte solution. Even though this pulse waveform generates very low currents, it is sufficient to allow electrons to be displaced in the battery electrolyte compound, thereby removing ions from the battery plates back into the electrolyte solution.

Typical values for some components in tow of the embodiments include:

| FIG. 1: | |
|---|---|
| Capacitor 35 | 250 microfarads |
| Resistor 31 | 15 ohms |
| Resistor 37 | 200 ohms |
| Capacitor 40 | 0.1 microfarads |
| Resistor 39 | 120 ohms |
| Resistor 50 | 150 ohms |
| Transistor 34 | NPN |
| Transformer 32: | |

Primary Coils 33 and 38 10 and 8 turns, respectively
Secondary Coils 41 and 42 30 turns each

| FIG. 2 | |
|---|---|
| Resistor 31' | 15 ohms |
| Capacitor 28' | 250 microfarads |
| Transistors 51 and 52 | NPN |
| Capacitor 59 | 0,1 microfarads |
| Resistor 57 | 250 ohms |
| Resistor 58 | 150 ohms |
| Resistor 50 | 150 ohms |

Transformer 32'

Opposite end Primary coins 55 and 56—10 turns

Coils 61 and 62—8 turns

Secondary Coins 41 and 42—30 turns

In the various embodiments, the primary to secondary transformer coils ratios fall in the approximate range of 1 to 3 to as much as 1 to 20.

The invention has been described with respect to several embodiments, it should be realized that various changes may be made without departure from the scope of the inventions as described above, and defined in the claims.

I claim:

1. A battery reclaimer, charger and maintainer circuit for removing current blocking deposits from plates of batteries utilizing liquid and jell electrolytes, comprising;

an output circuit including at least one battery to be reclaimed, maintained and recharged;

a D.C. voltage source providing a D.C. voltage for charging said battery connected to said output circuit;

an oscillator circuit, operating in the 2 to 10 megahertz range, for producing fast rise time voltage pulses;

a close coupled rf transformer, having ferrite ceramic cores, connecting the oscillator circuit to the output circuit in parallel with the D.C. voltage source; and a rectifier circuit connected between the transformer and the output circuit, the rectifier circuit including a two diode rectifying circuit for producing a full wave positive voltage output pulse having an RF content corresponding to the natural frequencies of the electrolyte used in the battery being charged for removing current blocking deposits for the battery plates.

2. The battery reclaimer according to claim 1, wherein the positive pulse has a range of frequencies of 2 to 10 MHZ.

3. The battery reclaimer according to claim 1, wherein the positive pulse output is superimposed upon the D.C. charging voltage.

4. The battery reclaimer according to claim 1, including a stepper timer for reclaiming and maintaining a plurality of batteries.

5. The battery reclaimer according to claim 1, wherein said transformer includes a ferrite ceramic core.

6. The battery reclaimer according to claim 1, wherein said oscillator is one selected from Hartley, Collpits and relaxation blocking bistable multi-vibrator oscillators.

7. The battery reclaimer according to claim 1, including a sequential timing circuit for connecting the battery reclaimer and maintainer to a plurality of batteries to reclaim and maintain said plurality of batteries while in use and in reserve.

8. The battery reclaimer according to claim 1, wherein said transformer has at least first and second windings, and said first and second winds have a turns ratio in the range of 1 to 20.

9. The battery reclaimer according to claim 1, wherein the positive output pulses have a multi frequency output in the range of 10 Khz to 100 Khz, and the output pulses have a fast rise time of less than one hundred nano seconds per volt.

10. A battery reclaimer, charger and maintainer circuit for removing current blocking deposits from plates of batteries utilizing liquid and jell electrolytes, comprising;

an output circuit including at least one battery to be reclaimed, maintained and recharged, said battery including an electrolyte having a natural resonant frequency;

a D.C. voltage source for charging said battery connected to said output circuit;

an oscillator circuit, operating in the 2 to 10 megahertz range, for producing fast rise time voltage pulses;

a close coupled rf transformer connecting the oscillator circuit to the output circuit in parallel with the D.C. voltage source; and a rectifier circuit connected between the transformer and the output circuit, the rectifier circuit including a two diode rectifying circuit for producing a voltage full wave positive output pulse having an RF content in a range of frequencies including the natural resonant frequency of the electrolyte used in the battery to be reclaimed.

11. The battery reclaimer according to claim 10, wherein the positive pulse output is superimposed upon the D.C. charging voltage.

12. The battery reclaimer according to claim 10, including a stepper timer for reclaiming and maintaining a plurality of batteries.

13. The battery reclaimer according to claim 10, wherein said transformer includes a ferrite ceramic core.

14. The battery reclaimer according to claim 10, wherein said oscillator is one selected from Hartley, Collpits and relaxation blocking bistable multi-vibrator oscillators.

15. The battery reclaimer according to claim 10, including a sequential timing circuit for connecting the battery reclaimer and maintainer to a plurality of batteries to reclaim and maintain said plurality of batteries while in use and in reserve.

16. The battery reclaimer according to claim 10, wherein said transformer has at least first and second windings, and said first and second winds have a turns ratio in the range of 1 to 20.

17. The battery reclaimer according to claim 10, wherein the positive output pulses have a multi frequency output in the range of 10 Khz to 100 Khz, and the output pulses have a fast rise time of less than one hundred nano seconds per volt.

18. A battery reclaimer, charger and maintainer circuit for removing current blocking deposits from plates of batteries utilizing liquid and jell electrolytes, comprising;

an output circuit including at least one battery to be reclaimed, maintained and recharged, said battery including an electrolyte having a natural resonant frequency;

a D.C. voltage source for charging said battery connected to said output circuit;

an oscillator circuit, operating in the 2 to 10 megahertz range, for producing fast rise time voltage pulses;

a close coupled rf transformer connecting the oscillator circuit to the output circuit in parallel with the D.C. voltage source, superimposing the voltage pulses on the D.C. charging voltage; and a rectifier circuit connected between the transformer and the output circuit, the rectifier circuit including a two diode rectifying circuit for producing a voltage full wave positive output pulse having an RF content having a range of frequencies between 2 MHZ and 10 MHZ.

\* \* \* \* \*